(12) United States Patent
Nishiyama et al.

(10) Patent No.: US 12,492,908 B2
(45) Date of Patent: Dec. 9, 2025

(54) AUTONOMOUS TRAVEL DEVICE AND AUTONOMOUS TRAVEL DEVICE CONTROL METHOD

(71) Applicant: NIDEC CORPORATION, Kyoto (JP)

(72) Inventors: Jun Nishiyama, Kyoto (JP); Shohei Imada, Kyoto (JP); Tomoki Yoshikawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 167 days.

(21) Appl. No.: 18/573,777

(22) PCT Filed: Mar. 16, 2022

(86) PCT No.: PCT/JP2022/012009
§ 371 (c)(1),
(2) Date: Dec. 22, 2023

(87) PCT Pub. No.: WO2022/270048
PCT Pub. Date: Dec. 29, 2022

(65) Prior Publication Data
US 2024/0361134 A1    Oct. 31, 2024

Related U.S. Application Data

(60) Provisional application No. 63/214,121, filed on Jun. 23, 2021.

(30) Foreign Application Priority Data

Oct. 25, 2021 (JP) .................................. 2021-173828

(51) Int. Cl.
*G01C 21/34*      (2006.01)
*G08G 1/16*       (2006.01)

(52) U.S. Cl.
CPC .......... *G01C 21/3461* (2013.01); *G08G 1/16* (2013.01)

(58) Field of Classification Search
CPC .......... G01C 21/24; G01C 21/34; G08G 1/09; G08G 1/16; G05D 1/02
See application file for complete search history.

(56) References Cited

U.S. PATENT DOCUMENTS 4,926,336 A    5/1990  Yamada
9,868,211 B2*  1/2018  Williams ............. G05D 1/0274
(Continued)

FOREIGN PATENT DOCUMENTS

JP    2008186340 A    8/2008
JP    2018185633 A    11/2018
JP    2021105963 A    7/2021

OTHER PUBLICATIONS

International Search Report in PCT/JP2022/012009, mailed May 17, 2022. 4pp.

*Primary Examiner* — Tan Q Nguyen
(74) *Attorney, Agent, or Firm* — HAUPTMAN HAM, LLP

(57) ABSTRACT

An aspect of an autonomous travel device includes a selected unit configured such that one option is selected from a plurality of options corresponding to each of a plurality of passage widths having mutually different degrees of freedom of movement allowed for travel through a passage, and a route search unit configured to search for, on the basis of map information, a travel route that avoids passages that are narrow relative to the passage width corresponding to the selected option.

7 Claims, 7 Drawing Sheets

(56) References Cited

U.S. PATENT DOCUMENTS

2011/0166737 A1* 7/2011 Tanaka ................. G05D 1/0217
   701/25
2022/0297680 A1* 9/2022 Nakanishi .............. G06V 20/58

* cited by examiner

DISTANCE TO CLOSEST OBSTACLE

AUTONOMOUS TRAVEL DEVICE AND AUTONOMOUS TRAVEL DEVICE CONTROL METHOD

RELATED APPLICATIONS

The present application is National Phase of International Application Number PCT/JP2022/012009, filed Mar. 16, 2022, and claims priorities based on U.S. provisional patent application No. 63/214,121, filed Jun. 23, 2021 and Japanese Patent Application No. 2021-173828, filed Oct. 25, 2021.

FIELD

The present invention relates to an autonomous travel device and an autonomous travel device control method.

BACKGROUND

Conventionally, autonomous travel devices for searching a route to a destination and travelling autonomously based on map information or the like are known. The map information includes information on obstacles, etc. The autonomous travel device searches for and determines a travel route within the zone where it can travel. Once the travel route is determined, the autonomous travel device travels autonomously following the travel route.

For example, in Patent Literature 1, in a travel vehicle system in which a travel vehicle follows a travel route divided by points, there is a proposal for a technology in which a blocking distance can be varied at each point and the blocking distance is variable according to the body length of the travel vehicle.

CITATION LIST

Patent Literature

Patent Literature 1:
JP 2008-186340 A

SUMMARY

Technical Problem

For example, on a so-called narrow passage of such width within which an autonomous travel device cannot easily rotate in place, there may be risks such that the autonomous travel device comes into contact with an obstacle or becomes unable to travel due to frequent control to avoid the obstacle. It is thus desirable to exclude such narrow passages from route search.

On the other hand, even when a narrow passage partially exists but the distance of which is short and there is plenty of space after passing through the narrow passage, it is desirable to search for a route that includes such a narrow passage.

Therefore, it is desirable to adjust the extent of the narrow passage that allows travel of the autonomous travel device, for example, by setting a minimum passage width according to conditions at the site to which the autonomous travel device is to be introduced.

However, the minimum passage width cannot be determined only by the size of the autonomous travel device, and the calculation of the minimum passage width also requires consideration of the accuracy of sensors and the accuracy of travel control, making it difficult for even experts such as system engineers to calculate and set an appropriate minimum passage width for the site conditions.

Therefore, an object of the present disclosure is to provide an autonomous travel device that can easily adjust the extent of the narrow passage that allows travel.

Solution to Problem

An aspect of the autonomous travel device according to the present disclosure includes a selected unit configured such that one option is selected from a plurality of options corresponding to each of a plurality of passage widths having mutually different degrees of freedom of movement allowed for travel through a passage, and a route search unit configured to search for, based on map information, a travel route that avoids passages that are narrow relative to the passage width corresponding to the selected option.

In addition, an aspect of the autonomous travel device control method according to the present disclosure involves: a selected process of selecting one option from a plurality of options corresponding to each of a plurality of passage widths having mutually different degrees of freedom of movement allowed for travel through a passage; and a route search process of searching for, based on map information, a travel route that avoids passages that are narrow relative to the passage width corresponding to the selected option.

Advantageous Effects of Invention

According to the present disclosure, it is possible to easily adjust the extent of the narrow passage that allows travel.

DESCRIPTION OF EMBODIMENTS

Embodiments of the autonomous travel device and the autonomous travel device control method of the present disclosure is described in detail with reference to the accompanying drawings. Please be noted that in order to avoid unnecessary redundancy in the following explanation and to facilitate the understanding of those skilled in the art, more detailed explanations than necessary may be omitted. For example, detailed explanations of already well-known matters or duplicate explanations for substantially identical configurations may be omitted. The elements described in the earlier drawings may be referred to as appropriate in the descriptions of the later drawings.

Figure 1:
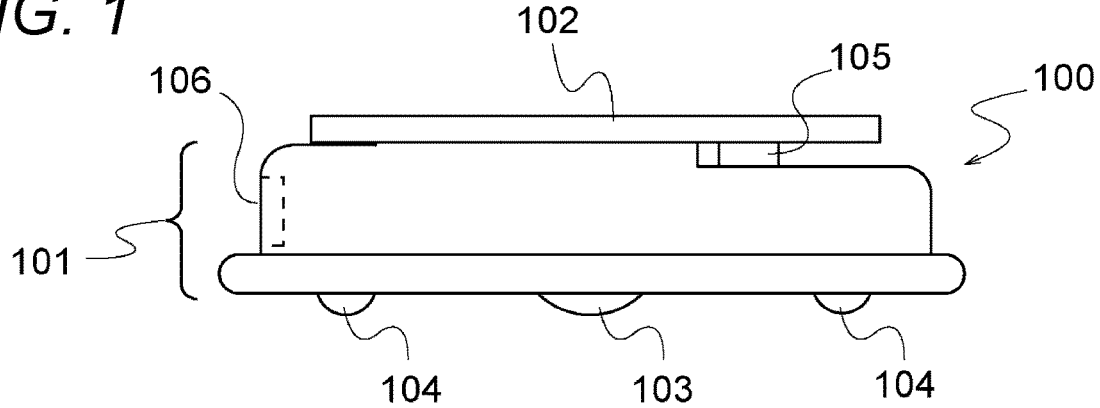
FIG. 1 is a side view of an appearance of an autonomous travel device of the present embodiment.
Figure 2:
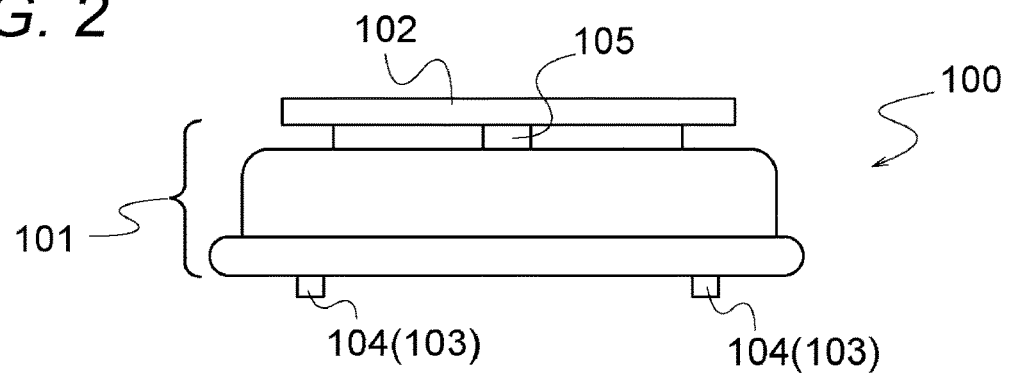
FIG. 2 is a front view of the appearance of the autonomous travel device of the present embodiment.
Figure 3:
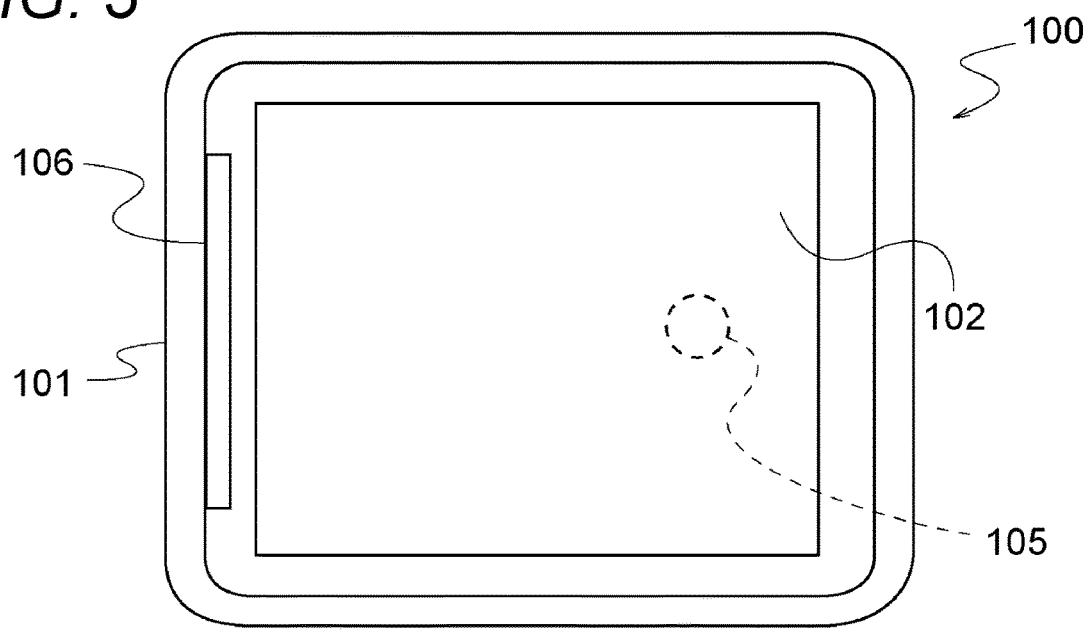
FIG. 3 is a top view of the appearance of the autonomous travel device of the present embodiment.

FIGS. 1 to 3 illustrate an appearance of the autonomous travel device of the present embodiment. FIG. 1 is a side view, FIG. 2 is a front view, and FIG. 3 is a top view.

An autonomous travel device 100 of the present embodiment is a device called an autonomous mobile robot (AMR) that transports materials and other items, for example, in factories and public places.

The autonomous travel device 100 includes a main unit 101, a cargo bed 102, wheels 103, casters 104, a forward sensor 105, and a rear sensor 106.

The main unit 101 incorporates a computer for control and a power supply for driving. The shape of the main unit 101 viewed from the vertical direction is a rectangular-like shape. The "rectangular-like shape" includes a rectangle, a rectangle with chamfered corners, and a rectangle with rounded corners. Hereinafter, the position of the forward sensor 105 may be illustrated as a landmark of front/rear of the autonomous travel device 100.

The cargo bed 102 is loaded with loads such as the materials. Although the size of the load may exceed the size of the cargo bed 102 or the main unit 101, for the sake of explanation, the following example is a case where the load is within the size of the cargo bed 102, unless otherwise noted.

The wheels 103 are provided at two locations on the left and right sides of the main unit 101 as an example, and are rotationally driven by a motor in the main unit 101. The left and right wheels 103 can be driven independently, and the autonomous travel device 100 can move forward, backward, rotate in place, and turn (so-called curving movements) by driving the left and right wheels 103.

The casters 104 are provided at each of the four corners of the main unit 101 as an example, and support the main unit 101 so that it does not tilt. The casters 104 have no driving force, roll according to the movement of the main unit 101, and change direction according to the movement of the main unit 101.

The forward sensor 105 detects obstacles or the like over a wide area in front of and to the left and right of the main unit 101. For example, 2D-LiDER is used as the forward sensor 105.

The rear sensor 106 detects obstacles or the like behind the main unit 101. For example, an infrared sensor is used as the rear sensor 106. The rear sensor 106 may have a plurality of sensor elements, for example, detection is performed by the sensor elements installed along a rearward exterior surface of the main unit 101.

Figure 4:
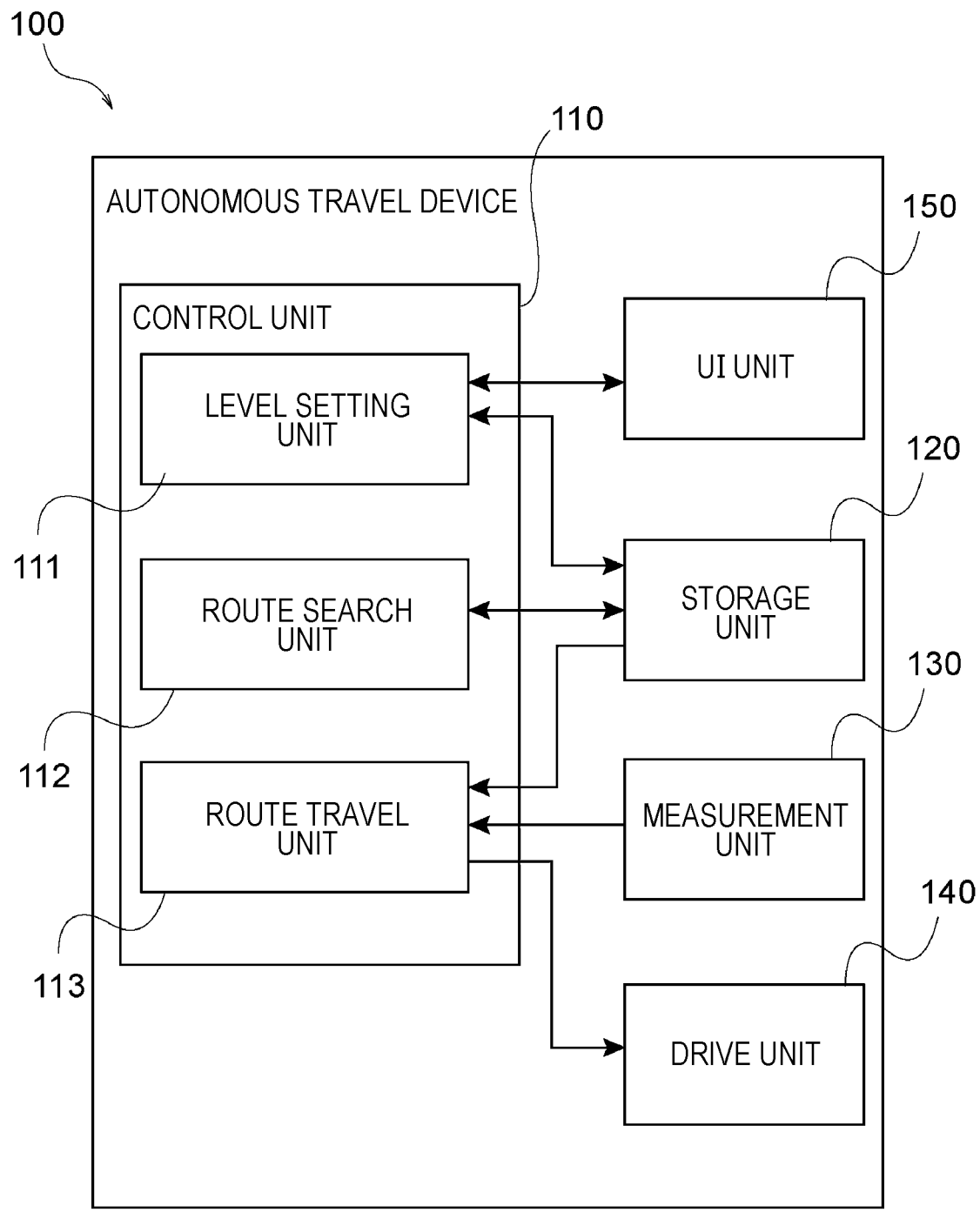
FIG. 4 is a functional block diagram illustrating a functional configuration of the autonomous travel device of the present embodiment.

FIG. 4 is a functional block diagram illustrating a functional configuration of the autonomous travel device 100 of the present embodiment.

The autonomous travel device 100 includes a control unit 110, a storage unit 120, a measurement unit 130, a drive unit 140, and a user interface (UI) unit 150.

The control unit 110 is a function carried out by a computer incorporated in the main unit 101, which controls the entire autonomous travel device 100.

The storage unit 120 stores map information of the zone in which the autonomous travel device 100 travels and the route to be traveled on that zone.

The measurement unit 130 is a function carried out by the forward sensor 105 and rear sensor 106, and measures obstacles or the like.

The drive unit 140 is a function carried by a power supply and a motor incorporated in the main unit 101 and the wheels 103. The autonomous travel device 100 travels when the drive unit 140 is driven according to the control by the control unit 110.

The UI unit 150 is a function carried by communication circuits or the like incorporated in the main unit 101, and transmits data of a setting screen displayed on a browser and receives information set on a setting screen. On the setting screen, a level is set that defines a minimum passage width within which the autonomous travel device 100 can pass therethrough. Three levels are available as an example, and the level is selected on the setting screen. A level lower than the selected level (corresponding to a narrower minimum passage width) is set as the lower limit of the level on the setting screen.

The details of the levels are described below, and the UI unit 150 corresponds to an example of the selected unit configured such that one option is selected from a plurality of options (e.g., levels) corresponding to each of a plurality of passage widths having mutually different degrees of freedom of movement allowed for travel through the passage. The process of level selection via the UI unit 150 corresponds to an example of the selected process as described in the present disclosure.

The control unit 110 includes a level setting unit 111, a route search unit 112, and a route travel unit 113.

Based on the level information received via the UI unit 150, the level setting unit 111 applies processing of blocking the passages that are narrow relative to the minimum passage width corresponding to the level, to the map information stored in the storage unit 120. Here, the passages that are narrow relative to the minimum passage width may be a passage having a width equal to or less than the minimum passage width or a passage having a width less than the minimum passage width. It may be blocked as the narrow passage only when the narrow portion continues longer than a predetermined length, or it may be blocked as the narrow passage regardless of the length of the narrow portion. The level setting unit 111 corresponds to an example of an information adding unit in the present disclosure, which adds inhibition information for inhibiting travel through the passages that are narrow relative to the minimum passage width to the map information. Examples of inhibition information are described below.

The route search unit 112 searches for and determines a route to a destination based on the map information stored in the storage unit 120, and stores the determined route in the storage unit 120. In the present embodiment, the route search unit 112 searches for a route that can reach the destination while avoiding the obstacles or the like indicated in the map information as a route, and determines the route that reaches the destination in the shortest time. In the present embodiment, the route search unit 112 searches for a travel route based on the map information to which the above inhibition information is added. In other words, the route search unit 112 corresponds to an example of a route search unit in the present disclosure, and searches for a travel route avoiding passages that are narrow relative to the minimum passage width corresponding to the selected option (e.g., level) based on the map information. The process of route search in the route search unit 112 corresponds to an example of the route search process in the present disclosure. By the configuration in which the route search unit 112 searches for a route from the map information to which inhibition information has been added by the level setting unit 111, it is possible to adopt, as an algorithm for route search in the route search unit 112, a common algorithm that is independent of the minimum passage width used as a reference.

The route travel unit 113 controls the drive unit 140 so that the autonomous travel device 100 travels along the route stored in the storage unit 120. In the present embodiment, the route travel unit 113 also controls to avoid the obstacles measured by the measurement unit 130.

Figure 5:
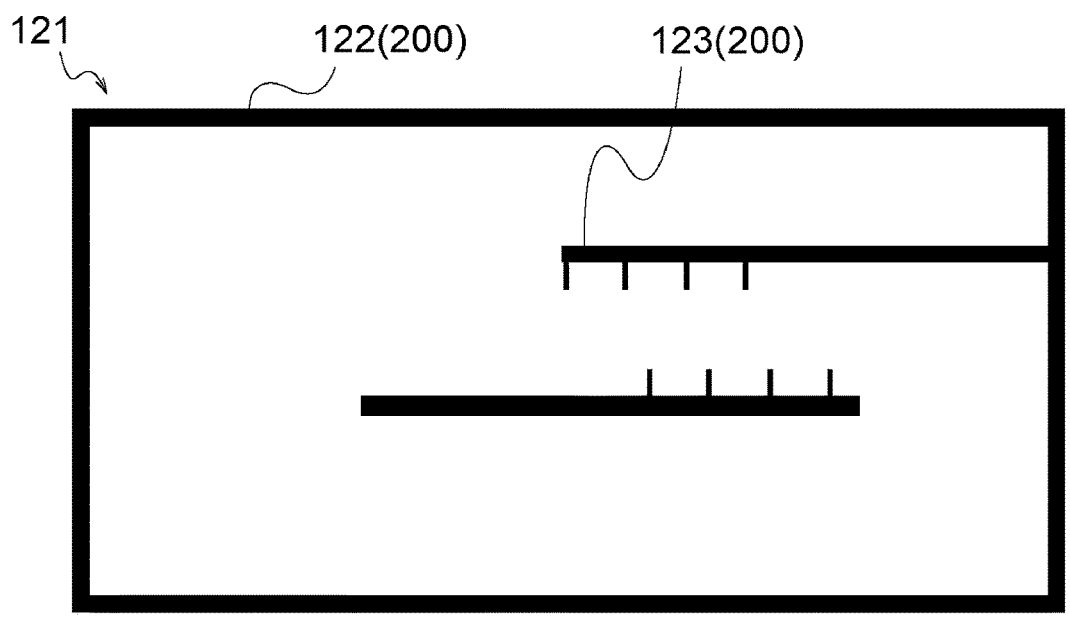
FIG. 5 is a diagram illustrating an example of map information.
Figure 6:
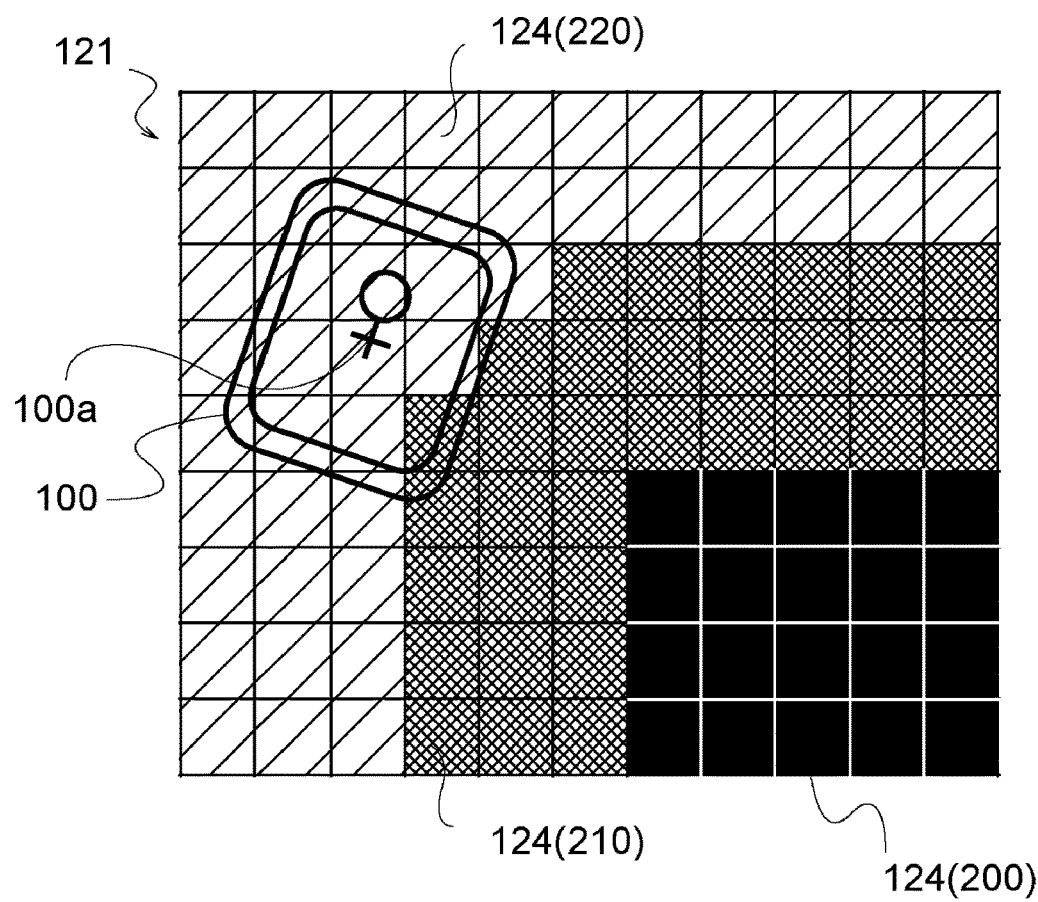
FIG. 6 is a diagram illustrating details of the map information.

FIG. 5 is a diagram illustrating an example of map information, and FIG. 6 is a diagram illustrating details of the map information.

Map information 121 shows information on walls 122 and shelves 123. The walls 122 and the shelves 123 are objects that are obstacles to the autonomous travel device 100, and are hereinafter collectively referred to as an obstacle 200, including the walls 122 and the shelves 123.

As illustrated in FIG. 6, the map information 121 shows a map as a set of unit blocks 124 in which a travel zone of the autonomous travel device 100 is divided into a grid pattern. The unit blocks 124 of the obstacle 200 each is assigned a cost of "100", for example, as information indicating as being the obstacle 200, and each of the other unit blocks 124 is assigned a cost of less than 100. The cost for each of the unit blocks 124 is assigned, for example, according to a distance from the obstacle 200.

The route search unit 112 uses a position of a vehicle body center 100*a* of the autonomous travel device 100 as the position of the autonomous travel device 100 on a zone shown by the map information 121. The route search unit 112 searches for and determines a moving route of the vehicle body center 100*a* as the travel route of the autonomous travel device 100.

Figure 7:
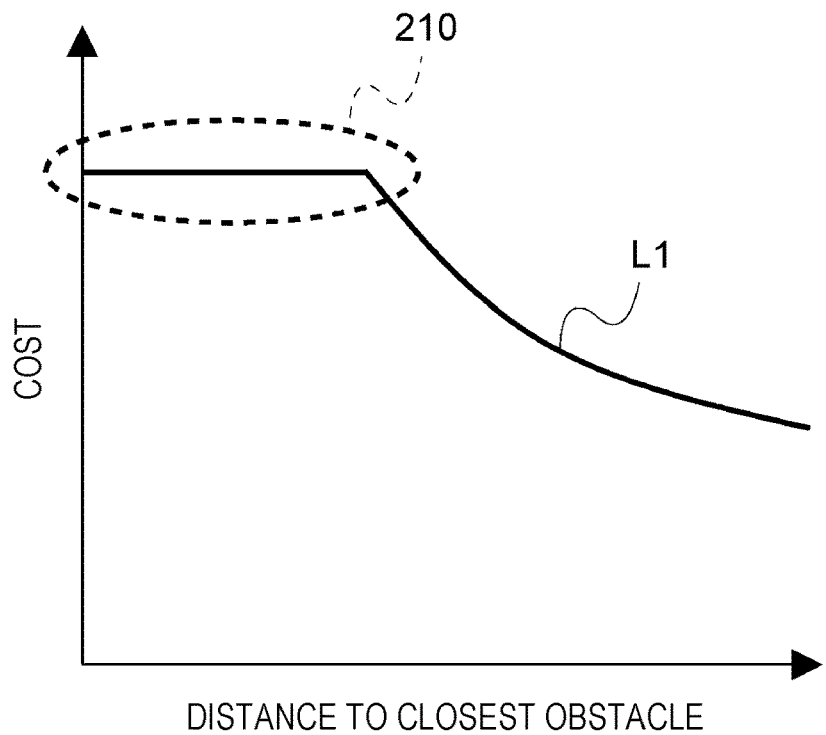
FIG. 7 is a graph illustrating costs assigned to unit blocks other than obstacles.

FIG. 7 is a graph illustrating the costs assigned to unit blocks 124 other than the obstacle 200.

The horizontal axis of the graph in FIG. 7 represents the distance from the unit blocks 124 to the closest obstacle 200, and the vertical axis represents the costs to be assigned.

The cost assigned to each of the unit blocks 124 is represented by a graph line L1 that is, for example, sloping downward to right and convex downward. The portion where the distance to the obstacle 200 is short, the graph line L1 becomes a straight line parallel to the horizontal axis. In other words, the map information 121 includes a cost for each location on the map (i.e., each unit block 124) according to its distance from the obstacle 200, with the highest cost assigned to the unit block 124 whose distance from the obstacle 200 is shorter than a predetermined distance. The unit blocks 124 each assigned with the highest cost are distributed around the obstacle 200, as illustrated in FIG. 6, and thus regarded as travel prohibited zones 210, which are excluded from the route search because the costs are too high. Each of the unit blocks 124 locating far from the obstacle 200 and is assigned a cost lower than the highest cost is regarded as travelable zone 220 that can be a portion of the travel route.

In the present embodiment, as an example, the length of the straight line portion parallel to the horizontal axis in the graph line L1 (i.e., the width of the travel prohibited zone 210) is set to a length corresponding to the minimum passage width described above.

In the present embodiment, in addition to the cost, a distance to the closest obstacle 200 is assigned to each of the unit blocks 124 in which the travel prohibited zones 210 are included. By assigning the distance to each of the unit blocks 124, it is enabled to change the cost including also the travel prohibited zones 210.

The route search unit 112 described above searches for a travel route within the travelable zone 220 and determines the travel route with the shortest travel distance.

Figure 8:
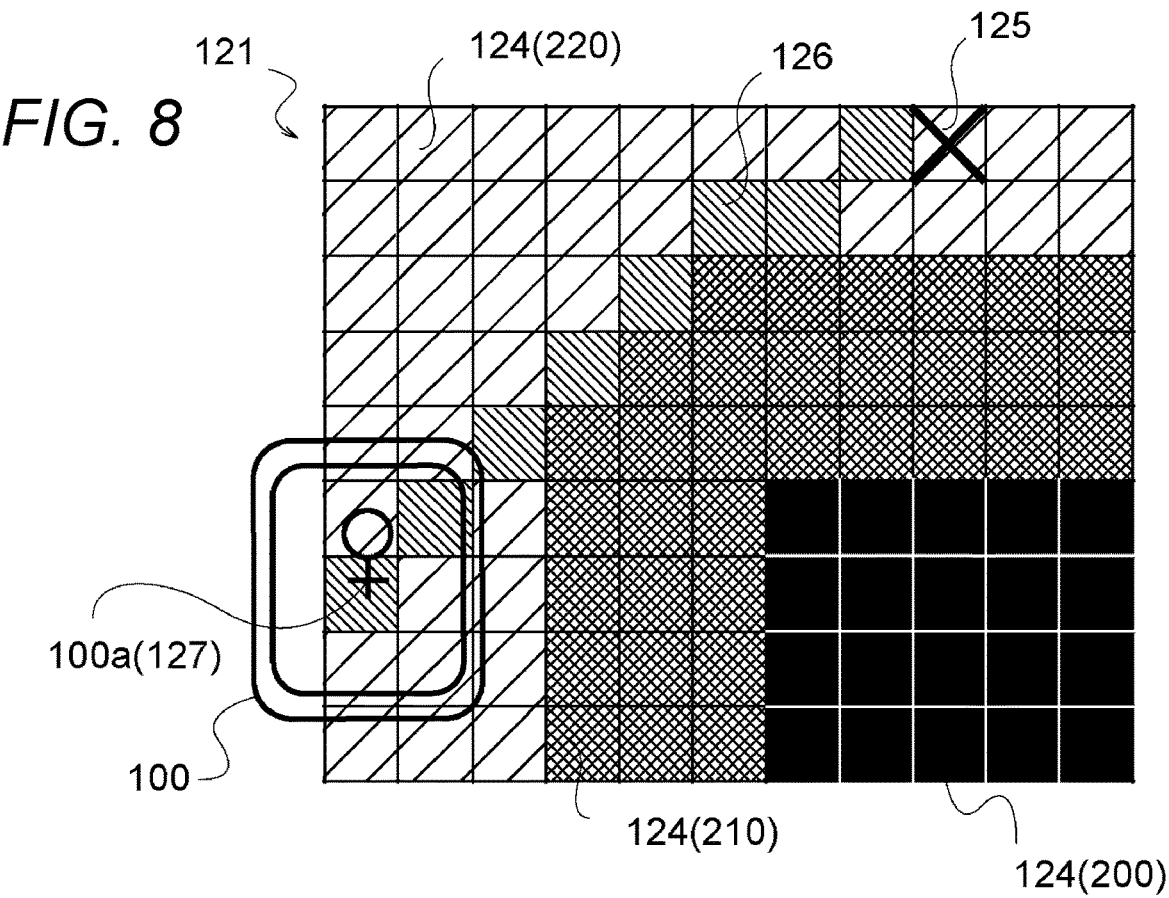
FIG. 8 is a diagram illustrating an example of a travel route.

FIG. 8 is a diagram illustrating an example of the travel route.

The route search unit 112 searches for a travel route 126 within the travelable zone 220 to a given destination 125 (e.g., a place to transport materials, etc.), using the unit block 124 where the vehicle body center 100*a* of the autonomous travel device 100 is positioned on the map information 121 as a starting point 127. The route search unit 112 searches and determines the travel route 126 in such a manner that the total of each cost assigned to each unit block 124 on the travel route 126 becomes small. In other words, the route search unit 112 searches for, as the travel route 126, a route in which the total of the costs becomes smaller.

As a result, the travel route 126 with a shorter travel distance is searched and determined. By providing the travel prohibited zone 210 around the obstacle 200, the travel route 126 goes by avoiding the travel prohibited zone 210, and the autonomous travel device 100 travels while keeping the vehicle body center 100*a* at a predetermined distance or more from the obstacle 200. Accordingly, the contact between the autonomous travel device 100 and the obstacle 200 is avoided.

Figure 9:
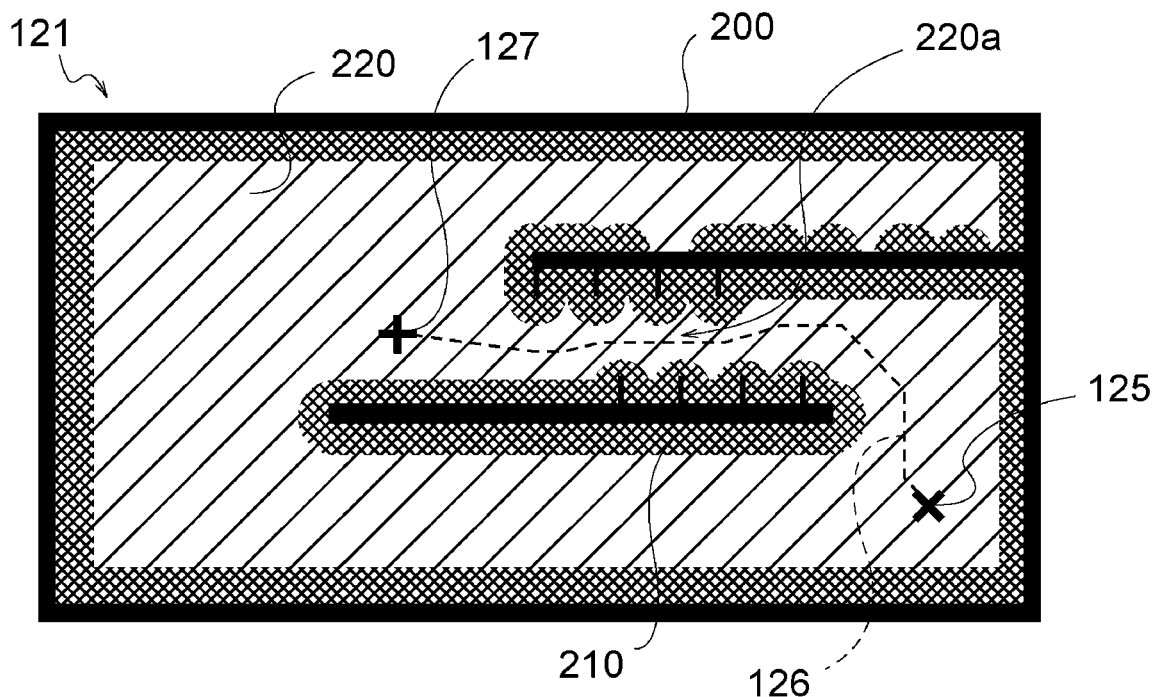
FIG. 9 is a diagram illustrating another example of a travel route.

FIG. 9 is a diagram illustrating another example of the travel route.

In the example illustrated in FIG. 9, as a result of searching for the travel route 126 with a shorter travel distance from the starting point 127 to the destination 125 on the zone shown by the map information 121, the travel route 126 that goes through the narrow passage 220*a* where the travelable zone 220 is narrowed by being sandwiched between the obstacle 200 and the travel prohibited zone 210 is determined. The travel route 126 is searched and determined because the travelable zone 220 is connected even at the portion of the narrow passage 220*a*.

When the width of the narrow passage 220*a* is narrow to the extent that the degree of freedom in traveling movement of the autonomous travel device 100 is significantly limited, in the travel route 126 that goes through the narrow passage 220*a*, both sides with the travel route 126 interposed therebetween is close to the obstacle 200. As a result, when the autonomous travel device 100 travels along the travel route 126, there may be risks such that the autonomous travel device 100 comes into contact with the obstacle 200 or becomes unable to travel due to difficulty in controlling to avoid the obstacle 200. Therefore, it is desirable to exclude the narrow passages 220*a* in the search for the travel route 126 by the route search unit 112.

On the other hand, there may be the case where the autonomous travel device 100 can pass through, for example, travel straight through even the narrow passage 220*a* having the narrow width, depending on the surrounding conditions. Therefore, the minimum passage width, which is the reference for the passage width within which the autonomous travel device 100 is allowed to travel, is set to a width appropriate to the conditions at the site where the autonomous travel device 100 is applied.

Since the larger the minimum passage width, the safer the autonomous travel device 100 can travel, the level that defines the minimum passage width may be paraphrased as the safety level of the autonomous travel device 100. In other words, depending on the conditions at the site where the autonomous travel device 100 is applied, the autonomous travel device 100 may be able to travel without problems even with a low safety level, or the autonomous travel device 100 may not be able to travel without a high safety level.

Here described the case where the safety level is changed and the minimum passage width is increased.

As mentioned above, the length of the straight line portion parallel to the horizontal axis in the graph line L1 illustrated in FIG. 7 (i.e., the width of the travel prohibited zone 210) is set to a length corresponding to the minimum passage width, so if the minimum passage width is increased, the width of the travel prohibited zone 210 is also increased.

Figure 10:
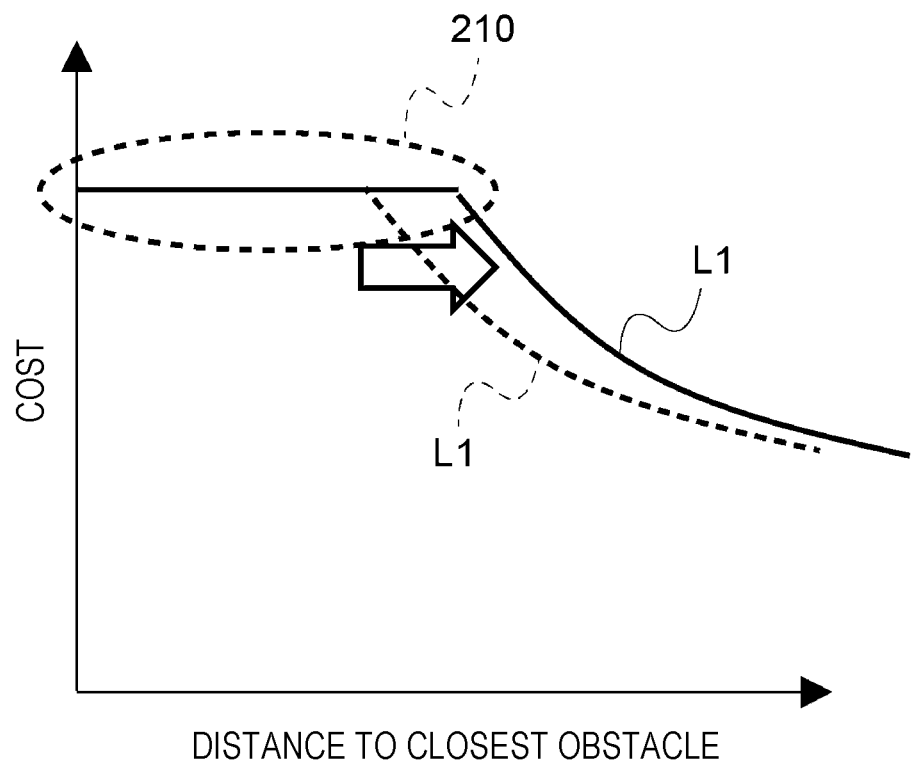
FIG. 10 is a graph illustrating an expansion of a travel prohibited zone.

FIG. 10 is a graph illustrating the expansion of the travel prohibited zone 210.

FIG. 10 illustrates a state in which the graph line L1 illustrated in FIG. 7 indicated by a dotted line is shifted to the longer distance side (i.e., to the right side of the graph) as indicated by a solid line. With the graph line L1 being shifted, the straight line portion corresponding to the prohibited zone 210 is extended so that the width of the travel prohibited zone 210 is widened. In other words, in the present embodiment, the cost of the travel prohibited zone 210 is used as the inhibition information referred to in the present disclosure.

The route search unit 112 performs route search based on the map information 121 in which the width of the travel prohibited zone 210 is widened.

Figure 11:
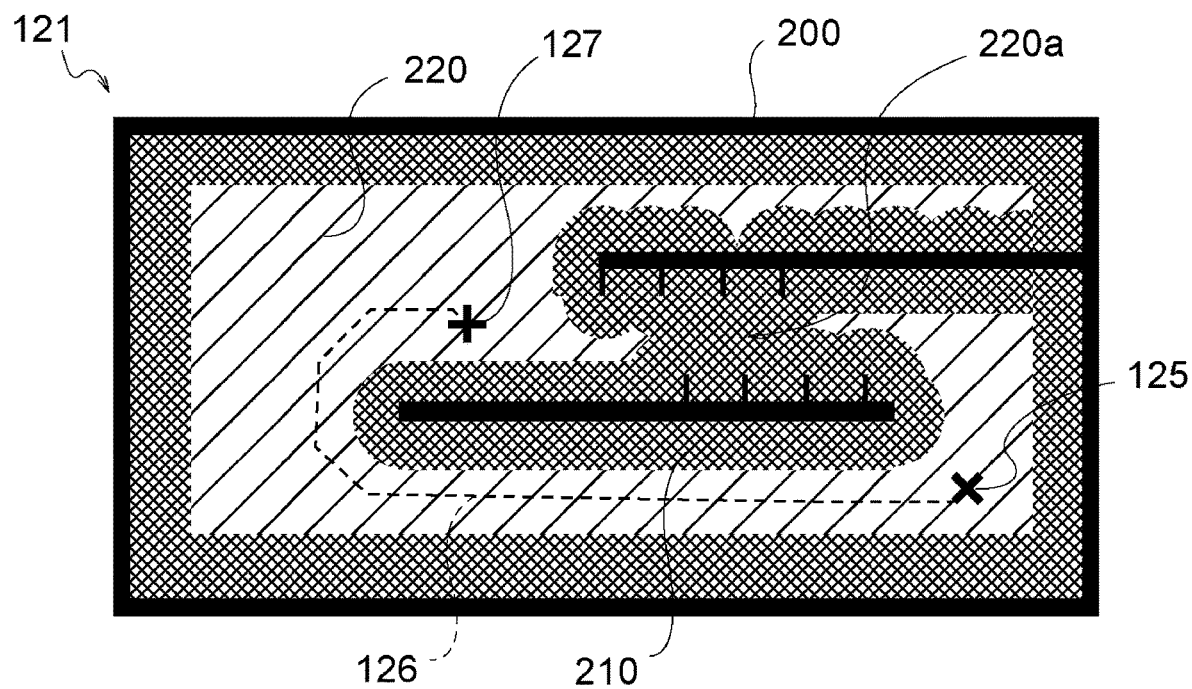
FIG. 11 is a diagram illustrating an example of a travel route based on map information in which the travel prohibited zone is expanded.

FIG. 11 is a diagram illustrating an example of the travel route 126 based on the map information 121 in which the travel prohibited zone 210 is expanded.

Due to the increased cost, the travel prohibited zone 210 is expanded in the entire zone indicated by the map information 121 and the narrow passage 220a is blocked by the travel prohibited zone 210. Conversely, the level setting unit 111 increases the cost sufficiently so that the narrow passage 220a having a narrow width relative to the minimum passage width, is blocked by the travel prohibited zone 210. As a result, the route search unit 112 searches and determines the travel route 126 in FIG. 11 that reaches from the starting point 127 to the destination 125 while avoiding the narrow passage 220a.

The uniform expansion of the travel prohibited zone 210 is an example of a means of blocking the narrow passage 220a having a narrow width, and the level setting unit 111 may also block the narrow passage 220a having a narrow width by means other than uniform expansion of the travel prohibited zone 210. For example, the level setting unit 111 may add the travel prohibited zone 210 only to a portion of the narrow passage 220a with narrow width.

As mentioned above, the level setting unit 111 blocks a passage that is narrow relative to the minimum passage width corresponding to a safety level on the map information 121, and the safety level is selected on the setting screen from a plurality of prepared safety levels. In the present embodiment, three safety levels are provided, as described below.

Figure 12:
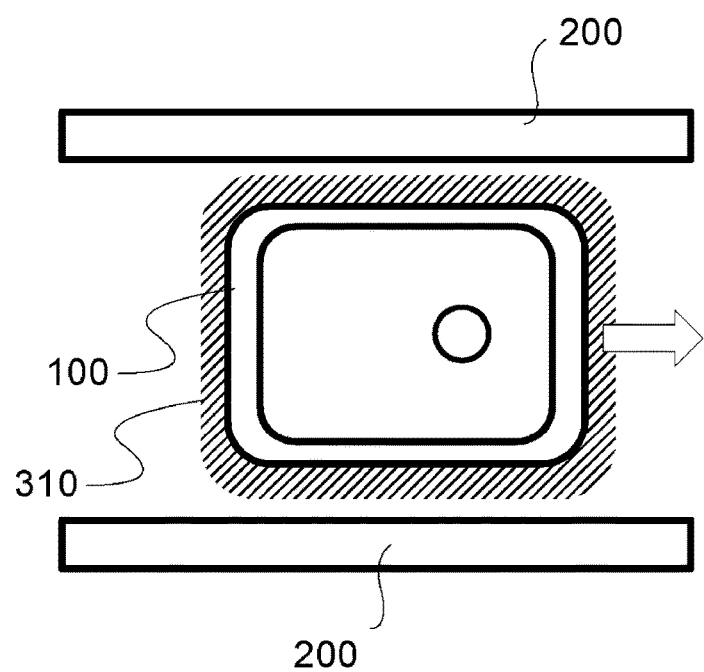
FIG. 12 is a conceptual diagram of a first level.

FIG. 12 is a conceptual diagram of a first level.

The first level, the lowest level of the three safety levels, is the safety level corresponding to the minimum passage width that is narrow to the extent that the autonomous travel device 100 can pass straight through but a stop zone 310 overlaps the obstacle 200 when the autonomous travel device 100 turns right or left.

The autonomous travel device 100 has the stop zone 310 in the surrounding thereof to avoid contact with the obstacle 200 during autonomous traveling, and the autonomous travel device 100 stops traveling when the obstacle 200 is detected in the stop zone 310. Therefore, the setting of the minimum passage width must take into account the size of the stop zone 310 and other factors.

At the first level, the minimum passage width is defined by the following equation (1), taking into account the width of the autonomous travel device 100 and the stop zone 310.

$$\text{Minimum passage width} = \text{ceil}\left((\text{vehicle body width}/2 - \text{resolution}/2 + \text{stop distance (side)} + \text{margin})/\text{resolution}\right) * \text{resolution} * 2 + \text{resolution} \quad (1)$$

Note that:
  resolution: the size of the unit block 124 in the map information 121
  ceil (x): the number of the unit blocks 124 corresponding to numerical value x (integer);
  stop distance (horizontal): the distance from the main unit 101 to the outer edge of the stop zone 310 in the horizontal direction of the autonomous travel device 100;
  margin: a margin provided between the outer edge of the stop zone 310 and obstacle 200.

As an example, when assuming that the vehicle width is 630 mm, the stop distance (horizontal) is 50 mm, the margin is 50 mm, and the resolution is 50 mm, the minimum passage width is 850 mm.

Figure 13:
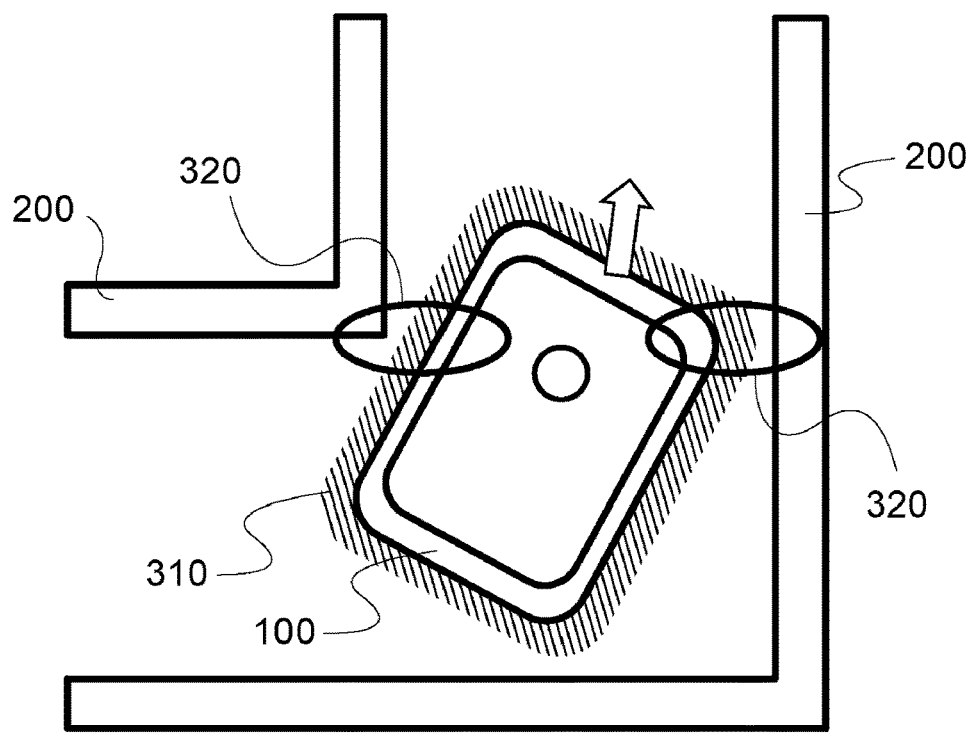
FIG. 13 is a conceptual diagram of a second level.

FIG. 13 is a conceptual diagram of a second level.

The second level, which is the intermediate level of the three safety levels, is the safety level corresponding to the minimum passage width that is narrow to the extent within which the autonomous travel device 100 can turn right or left, but the stop zone 310 overlaps the obstacle 200 when the autonomous travel device 100 makes a 360-degree rotation in place.

At the second level, the minimum passage width is defined by equations (2) to (4) as described below, taking into account the two locations 320 that are closest to the obstacle 200 when turning right/left.

$$A = \text{ceil}\left((\text{width}/2 - \text{resolution}/2 + \text{stop distance (horizontal)} + \text{margin})/\text{resolution}\right) * \text{resolution} + \text{resolution}/2 \quad (2)$$

$$B = \text{ceil}\left((\text{radius of circumscribed circle} - \text{resolution}/2 + \text{stop distance (maximum)} + \text{margin})/\text{resolution}\right) * \text{resolution} + \text{resolution}/2 \quad (3)$$

$$\text{Minimum passage width} = \text{ceil}\left(sqrt(A^2 + B^2 + 2*A*B*\cos(\pi/2 + \text{atan}(A/B))/\text{resolution}\right) * \text{resolution} \quad (4)$$

Note that:
  resolution: the size of the unit block 124 in the map information 121;
  ceil (x): the number of the unit blocks 124 corresponding to numerical value x (integer);
  radius of circumscribed circle: the radius of circle circumscribed by the main unit 101 of the autonomous travel device 100;

stop distance (horizontal): the distance from the main unit 101 to the outer edge of the stop zone 310 in the horizontal direction of the autonomous travel device 100;

stop distance (maximum): the maximum distance from the main unit 101 to the outer edge of the stop zone 310;

margin: a margin provided between the outer edge of the stop zone 310 and the obstacle 200.

As an example, when assuming that the vehicle body width is 630 mm, the radius of the circumscribed circle is 876 mm, the stop distance (in all directions) is 50 mm, the margin is 50 mm, and the resolution is 50 mm, the minimum passage width is 1050 mm.

Figure 14:
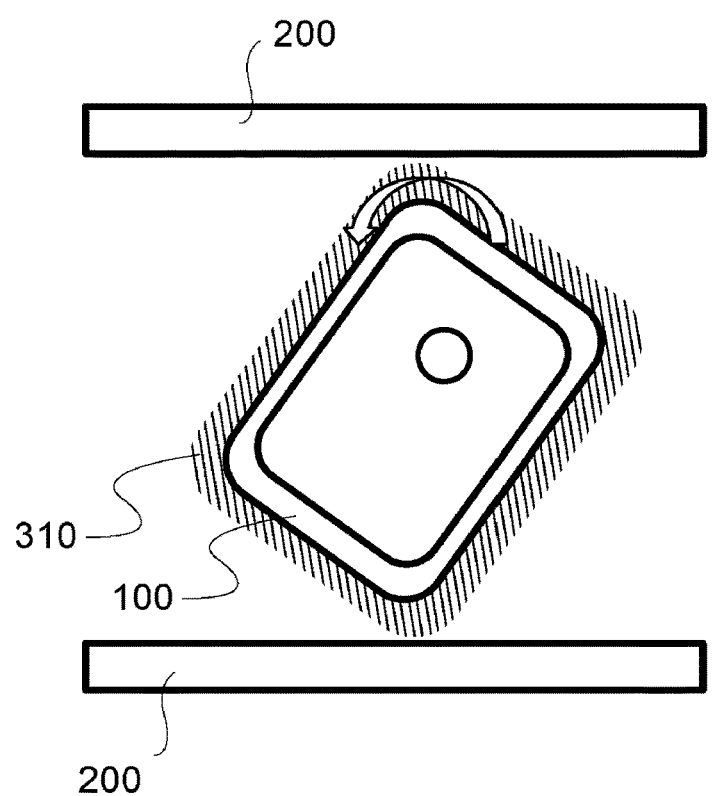
FIG. 14 is a conceptual diagram of a third level.

FIG. 14 is a conceptual diagram of a third level.

The third level, the highest of the three safety levels, is the safety level corresponding to the minimum passage width that is wide to the extent that the stop zone 310 does not overlap the obstacle 200 even when the autonomous travel device 100 makes a 360-degree rotation in place. In other words, at the third level, only routes that do not interfere with the freedom in traveling of the autonomous travel device 100 are searched.

At the third level, the minimum passage width is defined by the following equation (5), taking into account the circumscribed circle to the main unit 101.

$$\text{Minimum passage width} \lceil ((\text{radius of circumscribed circle} - \text{resolution}/2 + \text{stop distance (maximum)} + \text{margin})/\text{resolution}) * \text{resolution} * 2 + \text{resolution} \quad (5)$$

Note that:
resolution: the size of the unit block 124 in the map information 121 ceil (x);

ceil (x): the number of the unit blocks 124 corresponding to numerical value x (integer);

radius of circumscribed circle: the radius of circle circumscribed by the main unit 101 of the autonomous travel device 100;

stop distance (maximum): the maximum distance from the main unit 101 to the outer edge of the stop zone 310;

margin: a margin provided between the outer edge of the stop zone 310 and the obstacle 200.

As an example, when assuming that the vehicle body width is 630 mm, the radius of the circumscribed circle is 876 mm, the stop distance (maximum) is 50 mm, the margin is 50 mm, and the resolution is 50 mm, the minimum passage width is 1150 mm.

Thus, the minimum passage width for each safety level is obtained by taking into account a plurality of parameters related to the autonomous travel device 100. Suppose that a value between the minimum passage width corresponding to the first level and the minimum passage width corresponding to the second level is set as the minimum passage width, the autonomous travel device 100 will be limited in the same way as the first level in terms of freedom in traveling, while the degree of freedom of route search will be lower than the first level. Therefore, as the minimum passage width, the minimum passage width defined by each of the above-described equations is efficient for the travel of the autonomous travel device 100 and the route search.

In other words, by preparing and selecting a plurality of safety levels corresponding to the degree of freedom in passage traveling of the autonomous travel device 100, the minimum passage width that is efficient for the travel of the autonomous travel device 100 and the route search can be easily set. In selecting the safety level, a selector, such as a system engineer, can easily understand and select the safety level based on the freedom in traveling of the autonomous travel device 100.

It is desirable that the safety levels to be provided as a plurality of options include at least an option corresponding to the minimum passage width that allows straight traveling but does not allow right/left turns (i.e., the first level) and an option corresponding to the minimum passage width that allows right/left turns (i.e., the second level). The first level and the second level described above are easy to be selected because of the obvious correspondence with the shape of the passage through which the autonomous travel device 100 is required to travel.

It is also desirable that the safety levels provided as the options include at least an option corresponding to a minimum passage width that allows right/left turns and does not allow one rotation in place (i.e., the second level) and an option corresponding to a minimum passage width that allows one rotation in place (i.e., the third level). The second level and the third level described above are also easy to be selected because of the obvious correspondence with the shape of the passage through which the autonomous travel device is required to travel.

As mentioned above, the lower limit of the safety level is set along with the selection of the safety level on the setting screen transmitted by the UI unit 150 in the present embodiment. When the safety level is high, the autonomous travel device 100 has a high degree of freedom in passage traveling while the passages to be excluded from the travel route search increase, so there may be cases where a travel route that can reach the destination cannot be found. Therefore, in the present embodiment, re-searching with a reduced safety level is performed when a travel route is not found.

That is, if the route search unit 112 fails to find a route, the level setting unit 111 lowers the safety level by one and adds the inhibition information (cost) corresponding to the minimum passage width corresponding to the safety level one level lower to the map information. In other words, the level setting unit 111 corresponds to an example of an option change unit that changes the option (i.e., safety level) to another option with a lower degree of freedom of movement than the option when the route search unit 112 fails to find a travel route that reaches the destination.

The route search unit 112 then searches for a travel route that avoids passages that are narrow relative to the minimum passage width corresponding to the other options mentioned above, based on the map information. This increases the degree of freedom in searching for a travel route, and thus increases the possibility of finding a travel route that reaches the destination. By providing a function to lower the safety level upon failure of route searching, it is possible to operate in such a way that when there is a route with a higher safety level, the route is determined as a preferred travel route even if the route is long, and a route with a lower safety level is used to reach the destination only when there is no route with a high safety level.

Note that when the safety level is lowered too much, there increases a risk such that the autonomous travel device 100 becomes unable to travel upon traveling through the narrow passage 220*a*. Accordingly, in a case where the safety level reaches the set lower limit, no further change in the safety level is made. That is, until reaching the determined option among the options (i.e., safety levels), the level setting unit 111 changes the option to the other option in a case where the route search unit 112 fails to find a travel route that reaches the destination.

As a result, for example, when the third level is selected and the lower limit is set to the first level, the route search is first performed at the third level, and when it goes successfully, autonomous traveling is started. In a case where the route search at the third level fails, the route search is performed at the second level, and when it goes successfully, autonomous traveling is started. In a case where the route search at the second level fails, the route search is performed at the first level, and when it goes successfully, autonomous travelling is started, but when the route search fails even at the first level, the route search ends as route searching failure.

Since a lower safety level limit can be set, it is possible to prevent the autonomous travel device 100 from traveling through a passage that is an unintentionally low level of safety for the user.

Note that AMR is described herein as an example of application of the autonomous travel device and the autonomous travel device control method of the present disclosure, the application of the device and the method of the present disclosure is not limited to the above explanation, and can be used in a wide range of applications including an automatic guided vehicle (AGV) and self-driving cars.

The embodiments described above should be considered exemplary and not restrictive in all respects. The scope of the present disclosure is indicated by the claims, not by the embodiments described above, and is intended to include all meaning equivalent to the claims and modifications within the claims.

REFERENCE SIGNS LIST 100 autonomous travel device
100a vehicle body center
101 main unit
102 cargo bed
103 wheel
104 caster
105 forward sensor
106 rear sensor
110 control unit
111 level setting unit
112 route search unit
113 route travel unit
120 storage unit
130 measurement unit
140 drive unit
150 UI unit
121 map information
122 wall
123 shelf
124 unit block
125 destination
126 travel route
127 starting point
200 obstacle
210 travel prohibited zone
220 travelable zone
220a narrow passage
310 stop zone

The invention claimed is:

1. An autonomous travel device comprising:
a selected unit configured such that one option is selected from a plurality of options corresponding to each of a plurality of passage widths having mutually different degrees of freedom of movement allowed for travel through a passage; and
a route search unit configured to search for, based on map information, a travel route that avoids passages that are narrow relative to the passage width corresponding to the selected option.

2. The autonomous travel device according to claim 1, wherein the options include at least an option corresponding to a passage width that allows straight travel but does not allow right/left turns and an option corresponding to a passage width that allows right/left turns.

3. The autonomous travel device according to claim 1, wherein the options include at least an option corresponding to a passage width that allows right/left turns but does not allow one rotation in place, and an option corresponding to a passage width that allows one rotation in place.

4. The autonomous travel device according to claim 1, further comprising an information adding unit configured to add inhibition information for inhibiting travel through the narrow passage to the map information, wherein
the route search unit searches for a travel route based on the map information to which the inhibition information is added.

5. The autonomous travel device according to claim 1, wherein
the route search unit includes an option change unit configured to change the option to another option with a lower degree of freedom of movement than the option when the route search unit fails to find a travel route that reaches a destination, and
the route search unit searches for a travel route based on the map information that avoids passages that are narrow relative to the passage width corresponding to the other option.

6. The autonomous travel device according to claim 5, wherein until reaching a determined option among the options, the option change unit changes the option to the other option in a case where the route search unit fails to find a travel route that reaches the destination.

7. An autonomous travel device control method comprising:
a selected process of selecting one option from a plurality of options corresponding to each of a plurality of passage widths having mutually different degrees of freedom of movement allowed for travel through a passage; and
a route search process of searching for, based on map information, a travel route that avoids passages that are narrow relative to the passage width corresponding to the selected option.

* * * * *